(12) United States Patent  (10) Patent No.: US 7,726,717 B2
Onuma et al.  (45) Date of Patent: Jun. 1, 2010

(54) METHOD FOR MOUNTING PLASTIC GARNISH FOR PAINTING ON-LINE

(75) Inventors: Takashi Onuma, Dublin, OH (US); Mark Kralevich, Powell, OH (US); Aron Madsen, Marysville, OH (US); Derek Paul, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 11/962,348

(22) Filed: Dec. 21, 2007

(65) Prior Publication Data

US 2009/0160218 A1     Jun. 25, 2009

(51) Int. Cl.
*B60J 9/00* (2006.01)
(52) U.S. Cl. ...................................... 296/1.08
(58) Field of Classification Search ................. 296/1.08
See application file for complete search history.

(56) References Cited

U.S. PATENT DOCUMENTS

| | | | |
|---|---|---|---|
| 4,450,954 A | 5/1984 | O'Connell | |
| 5,385,375 A * | 1/1995 | Morgan et al. | 293/109 |
| 5,427,618 A * | 6/1995 | Haddix et al. | 118/500 |
| 5,427,822 A | 6/1995 | Bracciano | |
| 5,660,426 A * | 8/1997 | Sugimori et al. | 296/187.05 |
| 6,109,600 A * | 8/2000 | Yost et al. | 269/17 |
| 6,357,821 B1 * | 3/2002 | Maj et al. | 296/193.09 |
| 6,431,584 B1 * | 8/2002 | Nagasawa et al. | 280/728.2 |
| 6,827,390 B2 * | 12/2004 | Zummallen et al. | 296/146.11 |
| 6,832,800 B2 * | 12/2004 | Hwang | 296/39.1 |
| 6,837,934 B1 | 1/2005 | Patrykus | |
| 6,948,753 B2 * | 9/2005 | Yoshida et al. | 296/1.08 |
| 7,226,113 B2 * | 6/2007 | Dreier et al. | 296/1.08 |
| 7,540,550 B1 * | 6/2009 | Huber et al. | 296/29 |
| 7,552,955 B2 * | 6/2009 | Evans | 293/120 |
| 7,640,634 B2 * | 1/2010 | Vassiliou | 296/1.08 |

FOREIGN PATENT DOCUMENTS

| | | |
|---|---|---|
| JP | 61-227869 | 10/1986 |
| JP | 61-227870 | 10/1986 |
| JP | 63-031571 | 2/1988 |

\* cited by examiner

*Primary Examiner*—Kiran B. Patel
(74) *Attorney, Agent, or Firm*—Mark E. Duell; Rankin, Hill & Clark LLP

(57) ABSTRACT

A garnish for a vehicle body including a plastic exterior skin and a metal reinforcement member. The garnish is installed on the vehicle for coating or painting and then the garnish and the vehicle body are sent through a bake oven to cure the coating or paint. After exposure to the bake oven, the garnish is removed from the vehicle body for installation of a headlight assembly. The garnish is then reinstalled on the vehicle body after the headlight assembly is installed.

10 Claims, 5 Drawing Sheets

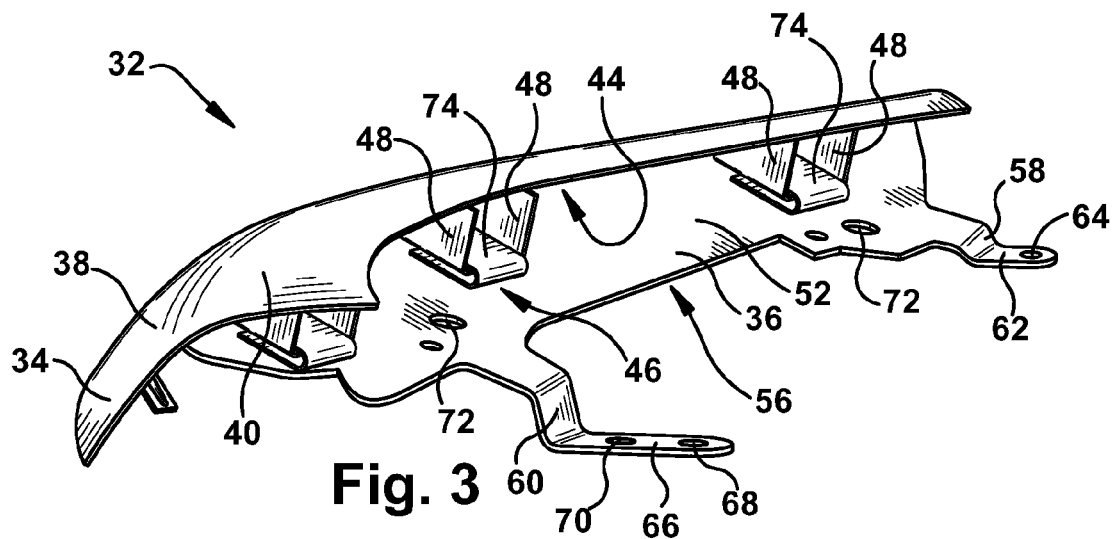
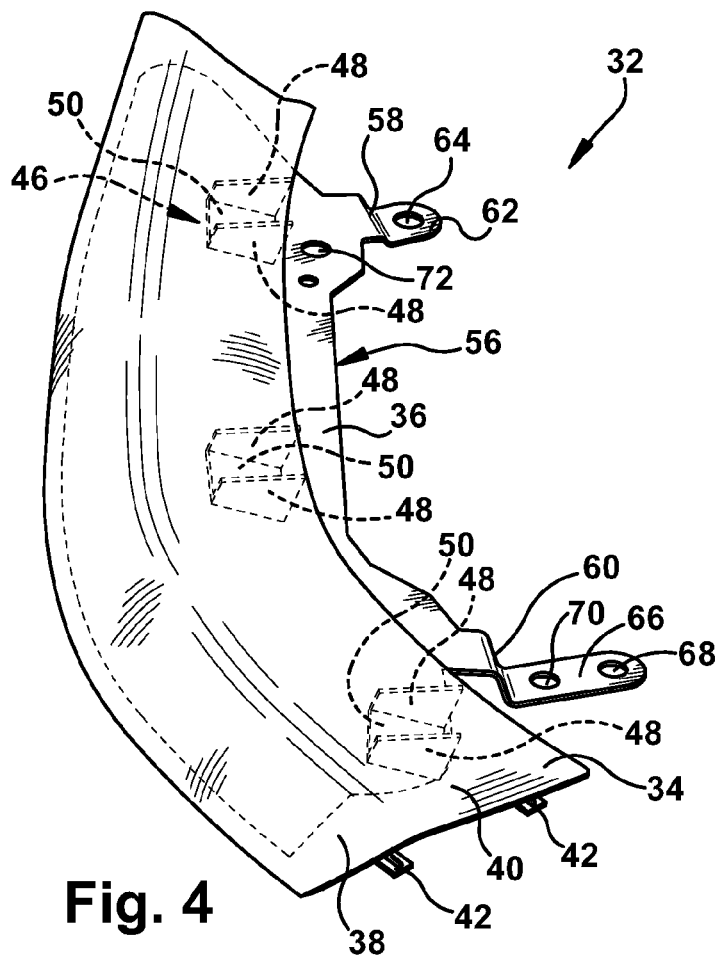

METHOD FOR MOUNTING PLASTIC GARNISH FOR PAINTING ON-LINE

BACKGROUND OF THE INVENTION

1. Field of the Invention

A method and apparatus for mounting a body part on a vehicle body for painting. In particular, a reinforcement member is connected to an exterior skin of the body part to prevent sagging of the body part during manufacture and subsequent use of the vehicle.

2. Description of Related Art

A vehicle body is the shell to which body parts of the vehicle are attached. Portions of the vehicle body that are easily visible after the vehicle is fully assembled include, for example, the A-pillar, the vehicle roof, and the areas surrounding the hood, doors, and trunk. Body parts typically include exterior vehicle components that are bolted onto the vehicle body. These body parts, which are non-integral to the body may include, for example, plastic garnishes, bumpers, fenders, grilles, passage doors, and fuel doors.

Traditional body parts may be made of a plastic derivative or of metal. Plastic body parts and metal body parts each have inherent advantages and disadvantages. For example, while the plastic body parts may be formed into many more shapes than the metal body parts, the plastic body parts are prone to bending when a force is applied to them. This is undesirable to the owner of the vehicle and may cause the vehicle owner to have negative feelings about the vehicle. Specifically, the owner may believe that the vehicle is made with defective or low quality components. Further, plastic body parts are more sensitive to elevated temperatures that can occur during the vehicle manufacturing process, as will discussed hereinafter. On the other hand, while metal body parts are sturdy, a metal body part typically weighs more than the equivalent plastic body part. As such, the fuel economy for vehicles with a significant number of metal body parts is reduced. Metal body parts also may rust or corrode, thereby detracting from the appearance of the vehicle. Accordingly, a vehicle made of both metal and plastic body parts is desirable for a variety of reasons.

During the manufacture of a vehicle, vehicle bodies and body parts are coated during a series of steps as they are conveyed along a coating line. This coating may be traditional spray painting, or may be for example, an electro-static coating. These coating steps include applying a primer to prepare the respective surfaces of the body and body parts for painting, applying a base coat for adding color to the body and body parts, and applying a clear-coat that functions as a protectant for the body and body parts.

In between these coating steps, the vehicle body and body the parts are passed through bake ovens. In the bake ovens, heated air is directed toward the body and the body parts. The bake ovens ensure that the coatings applied to the body and the body parts are adequately dried.

When the body and the body parts are made of different materials, there are usually separate bake ovens for baking the body and the body parts. The separate bake ovens are usually operated at dissimilar temperatures. Furthermore, the amount of time that the coated body and coated body parts are in the different bake ovens can be altered to affect the amount of heat that is exposed to the coated body and coated body parts. For example, the coated body may be baked by exposure to a high temperature for a short period of time. Alternatively, the coated body part may be baked by exposure to a low temperature for a long period of time.

The body parts and the body that are made of dissimilar materials are separately passed through the bake ovens because of differences in the heat tolerances of the materials that make up the body and body parts. For example, the vehicle body is made of steel, and the body parts are made of some derivative of plastic. The steel vehicle body may be exposed to a much higher temperatures in the bake ovens than the plastic body parts. Unfortunately, there are several unintended consequences of preparing the parts in this separate manner.

Since the vehicle body and the body parts are separately coated and baked, there can be an appearance mismatch between the vehicle body and the body parts. Specifically, because of lot to lot variation in coating ingredients and exposure to different baking conditions, the vehicle body and the body parts can have different appearances due to color and finish differences. The body and body parts may have slightly different color hues after being coated, the amount of sheen of the clear coat may be different, and/or the respective surfaces may have different levels of smoothness. As the body and the body parts are usually assembled so that they border each other, any appearance difference is easily detected and thus, undesirable.

Furthermore, additional labor is required when the vehicle body and the body parts are separately coated. The body parts must first be coated and then later assembled with the vehicle body. As such, to be coated, the body parts are attached to a jig to be fed through the coating line and then removed from the jig after completion of the coating. Then, the body parts are installed on the vehicle body.

Accordingly, it is considered apparent why it is not desirable to separately coat the vehicle body and body parts. However, numerous difficulties are also encountered when the vehicle body and body parts are coated and baked as a single entity. For example, as mentioned hereinbefore, the vehicle bodies are usually made primarily of some form of steel and the body parts can be made of a material different than steel, such as, for example plastic. When the combined body and body parts are coated and baked together, difficulties arise during the baking process.

The body parts, which are preferably made of plastic, are not typically as tolerant of high temperatures as the body that is made of steel. As such, damage can occur to the body parts when the body and body parts are jointly baked at a higher temperature. Primarily, any body part that has a horizontal section is especially susceptible to sagging of the body part. Sagging is not only an appearance defect, but can also cause misalignment issues. For example, if the body part is located near the vehicle hood and headlight opening, the sagging body part can prevent opening/closure of the hood.

Therefore, there exists a need in the art for a body part that is made from a plastic material and is tolerant of the increased temperatures of a bake oven that is traditionally used for metal vehicle bodies.

SUMMARY OF THE INVENTION

The present invention is directed toward a vehicle body part that has a plastic exterior skin, and is reinforced by a metal reinforcement member.

In accordance with the present invention, the body part is removed from the vehicle during installation of a headlight assembly and then reinstalled during final assembly of the vehicle.

BRIEF DESCRIPTION OF THE DRAWINGS

These and further features of the invention will be apparent with reference to the following description and drawings, wherein:

FIG. 3 is a rear perspective view of the body part;

FIG. 4 is a side perspective view of the body part;

DETAILED DESCRIPTION OF THE PREFERRED EMBODIMENTS

Figure 1:
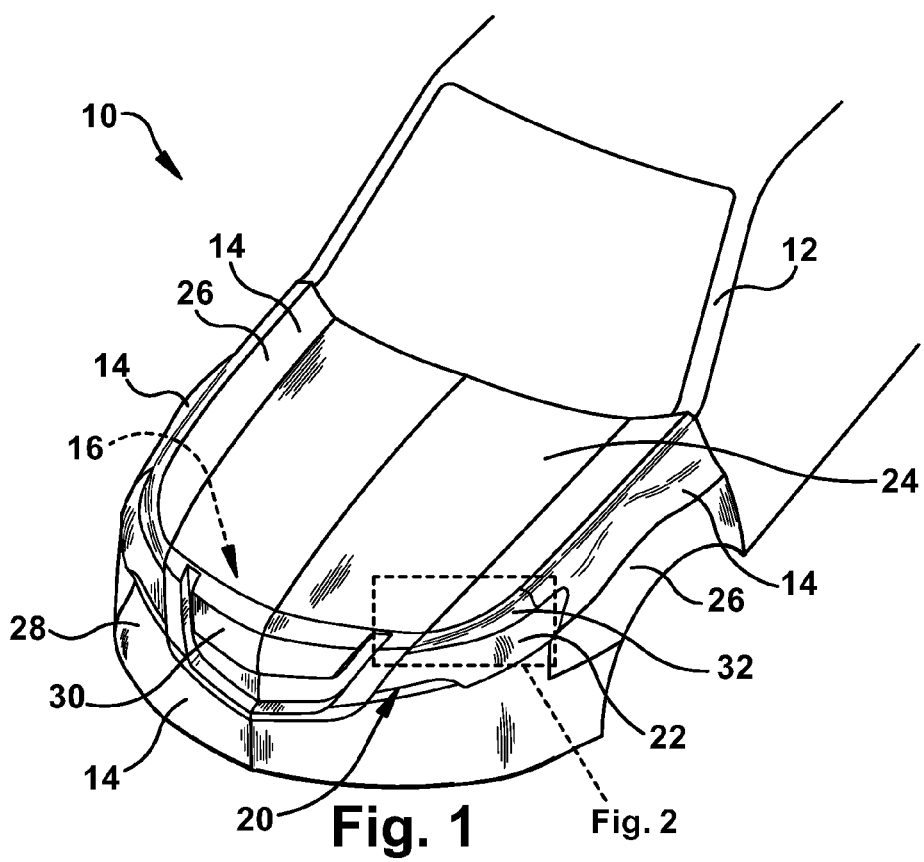
FIG. 1 is a perspective view of a body part installed on a vehicle according to the present invention with the body part in a final position.

With reference to FIGS. 1-8, the present invention is directed toward a vehicle 10 including a body 12 and body parts 14. The body 12 includes a bulkhead 16 with a pivot pin 18 and a headlight assembly 20 with a lens 22. The body parts 14 include a hood 24, fenders 26, a bumper 28, a grill 30, and a garnish 32. The garnish 32 is comprised of an exterior skin 34 and a reinforcement member 36. The exterior skin 34 has a fascia 38, a top wall 40, locating tabs 42, an underside 44, and a doghouse 46 with vertical walls 48 and a bottom wall 50. The reinforcement member 36 includes a support plate 52 with a front edge 54 and a back edge 56, a pivot extension member 58, an attachment extension member 60, a pivot arm 62 with a pivot hole 64, and an attachment arm 66 with initial and final position holes 68, 70. Mounting holes 72 are disposed near the back edge 56 of the reinforcement member 36. J-clips 74 attach the reinforcement member 36 with the exterior skin 34.

As is known in the art, body 12 and body parts 14 of the vehicle 10 are coated/painted before delivery of the vehicle 10 to a vehicle owner. In particular, as mentioned hereinbefore, a primer is applied to prepare the respective surfaces of the body 12 and body parts 14 for painting, a base coat is applied to add color to the body 12 and body parts 14, and a clear-coat is applied that protect the body 12 and body parts 14 from degradation due to environmental exposure. Alternatively, the vehicle body 12 and body parts 14 can be coated with an electro-static coating. After each application of the primer, the base coat, and the clear coat, the vehicle body 12 and body parts 14 are cured with a bake oven (not shown). The bake oven directs heated air toward the body 12 and body parts 14 and ensures that the coatings applied to the body 12 and body parts 14 are adequately dried. To facilitate electro-static coating of the garnish 32, a grounding strap (not shown) may be attached to the reinforcement member 36 of the garnish 32. However, it is preferable that the exterior skin 34 of the garnish 32 be of a material that is electrically conductive. Thus, the need for the grounding strap is eliminated.

Figure 7:
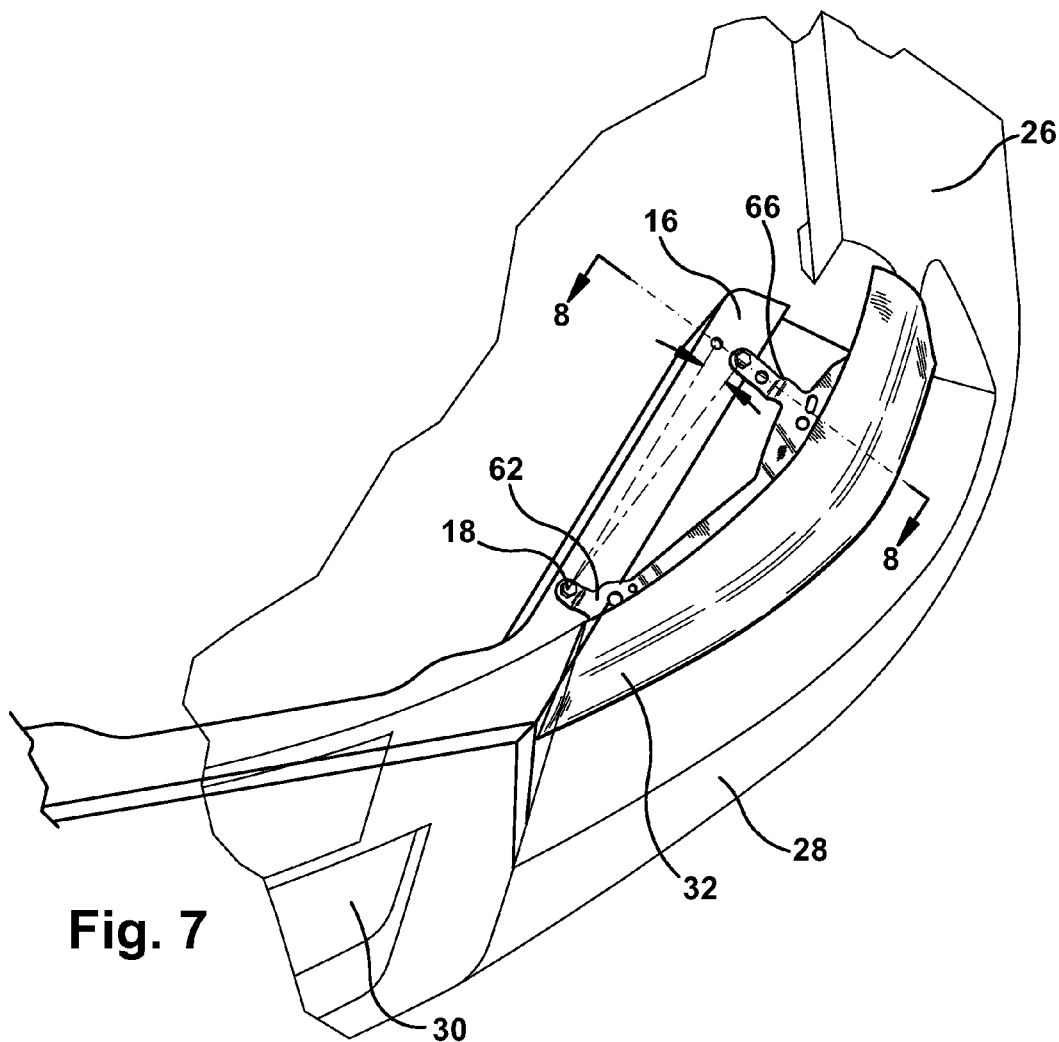
FIG. 7 is perspective view of the body part installed on the vehicle, with the body part in an initial position.

As is shown in FIGS. 1 and 7, the bulkhead 16 is a structural assembly that strengthens the vehicle 10 and provides an area to which various vehicle components are attached. As such, the bulkhead 16 extends generally across the entire width of the vehicle 10 (e.g. between the fenders 26). The bulkhead 16 can be of various types of wall-like construction, as is known in the art. The headlight assembly 20, the fenders 26, the grill 30, and the garnish 32 are attached to the bulkhead 16. Accordingly, the bulkhead 16 receives several fasteners for attachment of these components 20, 26, 30, 32. The fasteners may directly threadingly engage the bulkhead 16 or weld-nuts attached to the bulkhead 16 may engage the fasteners to secure the components 20, 26, 30, 32.

As is shown in FIG. 7, the pivot pin 18 extends upward from the bulkhead 16 and is of a hexagonal shape; however, other shapes such as cylindrical, are contemplated and possible. The pivot pin 18 is sized so as to be received within the pivot hole 64 of the reinforcement member 36. It is considered apparent that the pivot pin 18 could alternatively be a fastener that would permit pivotal engagement between the bulkhead 16 and the reinforcement member 36.

Figure 6:
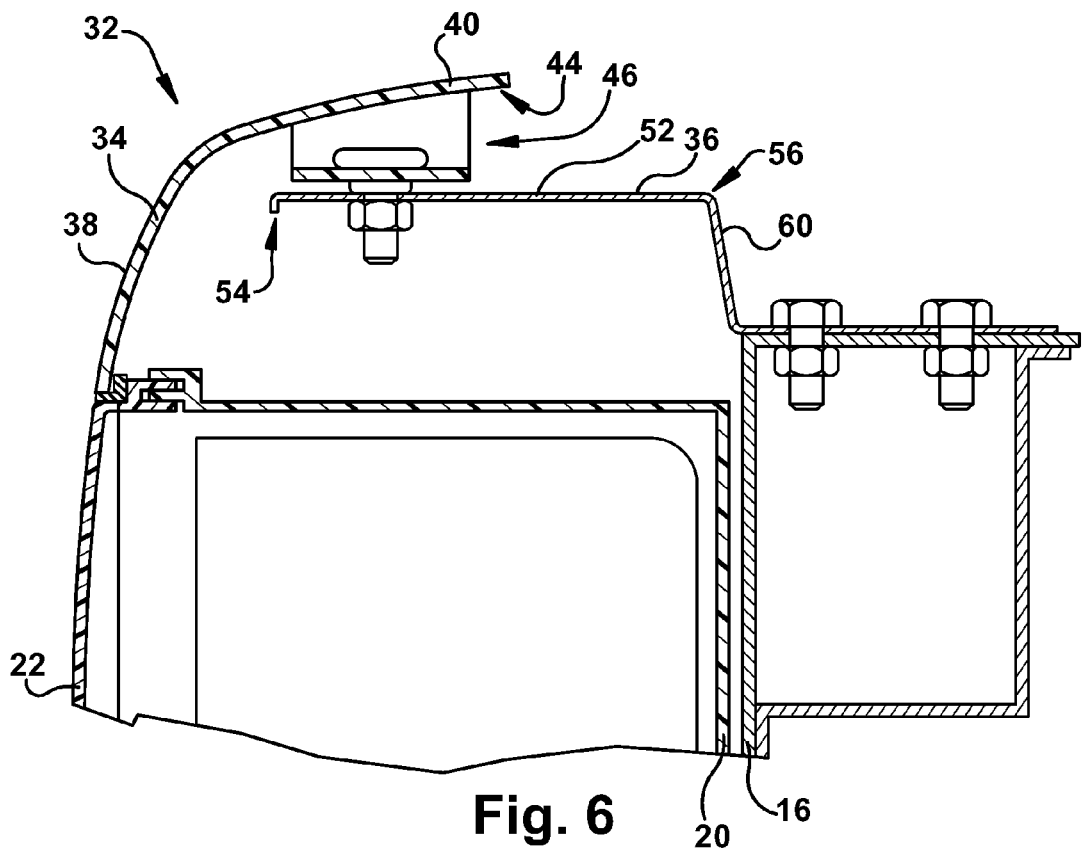
FIG. 6 is an additional side sectional view of the body part installed in the vehicle after installation of the headlight assembly.

With reference to FIGS. 1 and 6, the headlight assembly 20 is of common construction and is of a generally rectangular box shape. Traditionally, the headlight assembly 20 has a reflective rear surface to reflect light outward through the headlight lens 22. The headlight lens 22 is laterally curved between the grill 30 and the fender 26 and is preferably transparent. In addition, the hood 24, fenders 26, bumper 28, and grill 30 are well known in the art.

The garnish 32 generally extends between the grill 30 and the fender 26 in the horizontal direction. In the vertical direction, the garnish 32 extends between the headlight lens 22 and the hood 24. The garnish 32 is comprised of the exterior skin 34 and the reinforcement member 36, as illustrated in FIGS. 3 and 4. While the present invention primarily discusses the reinforcement member 36 and the exterior skin 34 as they apply to the garnish 32, it is understood that the present invention is equally applicable to other vehicle body parts. Particularly, the present invention is beneficial with any body part that has a generally horizontal portion. As mentioned hereinbefore, the generally horizontal portion of a plastic body part is more susceptible to sagging when heated in a baking oven than a vertical portion of the plastic body part. Furthermore, the present invention is illustrated as being on a right side of the vehicle 10, as viewed from the front. However, it is understood that the present invention is equally applicable to a left side of the vehicle 10.

As is shown in FIGS. 1 and 4, the exterior skin 34 of the garnish 32 extends between the grill 30 and the fender 26 with a lateral curve. The lateral curve of the exterior skin 34 has a same or similar curvature as the headlight lens 22. When looking at the vehicle 10 from a front perspective, the fascia 38 of the exterior skin 34 is vertically inclined toward the vehicle 10 when extending between the headlight assembly 20 and the top wall 40. The top wall 40 is generally horizontal and extends between the fascia 38 and the hood 24 along a length of the vehicle 10. With particular reference to FIG. 4, the locating tabs 42 are disposed on a side of the garnish 32 that is adjacent the fender 26. The locating tabs 42 primarily engage the fender 26 and provide a secure attachment between the garnish 32 and the fender 26.

FIG. 3 illustrates the doghouse 46 that is disposed on the underside 44 of the exterior skin 34. Specifically, the doghouse 46 includes the two nearly parallel vertical walls 48 that extend downward from the underside 44 of the exterior skin 34 to the bottom wall 50. The bottom wall 50 is generally horizontal and acts to connect the two vertical walls 48. The doghouse 46 receives the J-clip 74 of the reinforcement member 36 that is of common construction. While the garnish 32 is illustrated with two doghouses 46, either one or several are also possible and contemplated.

The J-clip 74 receives a threaded fastener that attaches the exterior skin 34 and the reinforcement member 36. Specifically, the J-clip 74 is of a generally J shape and includes a threaded hole (not shown) to receive the fastener. The J-clip 74 functions so as to reinforce the doghouse 46 and provide a robust hole to receive the threaded fastener. Alternatively, it is contemplated and possible to connect the exterior skin 34 and the reinforcement member 36 without the doghouse 46 or the J-clip 74. Instead, any number of commercially available fasteners would be acceptable.

Figure 5:
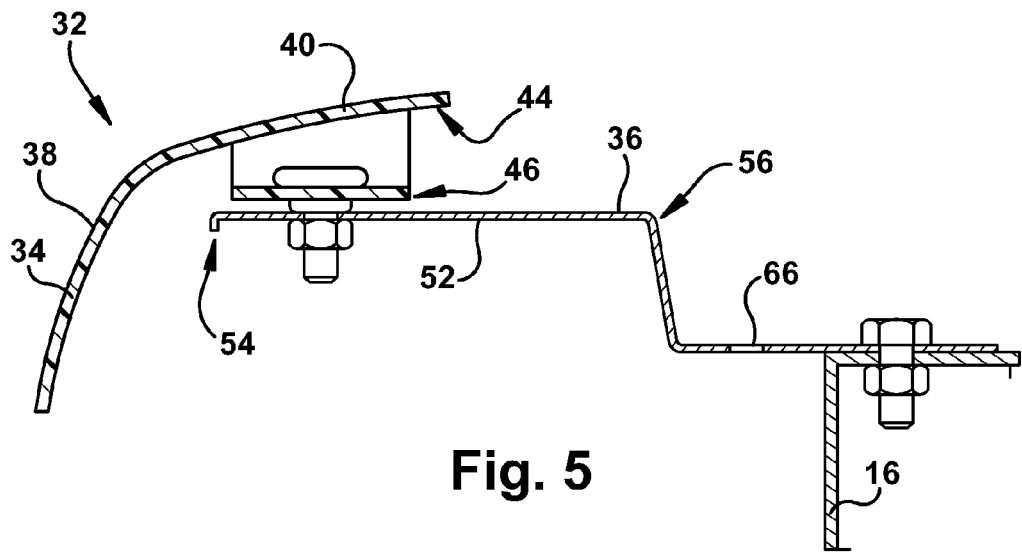
FIG. 5 is a side sectional view of the body part installed in the vehicle before installation of a headlight assembly.

As is best shown in FIG. 5, the reinforcement member 36 has, in general, a Z shape. The reinforcement member 36 laterally extends between a portion of the grill 30 and the fender 26 as illustrated in FIGS. 1 and 7. The support plate 52 horizontally extends from the front edge 54 to the back edge 56. As illustrated, the front edge 54 has a slight curve; however the front edge 54 could be straight or differently shaped.

As is best shown in FIGS. 3-4, after the support plate 52 extends rearwardly to the back edge 56, the pivot extension member 58 and the attachment extension member 60 extend vertically downward. The pivot arm 62 and the attachment arm 66 horizontally extend away from the front edge 54. Both the pivot arm 62 and attachment arm 66 have rounded ends, but other shapes are possible.

Figure 2:
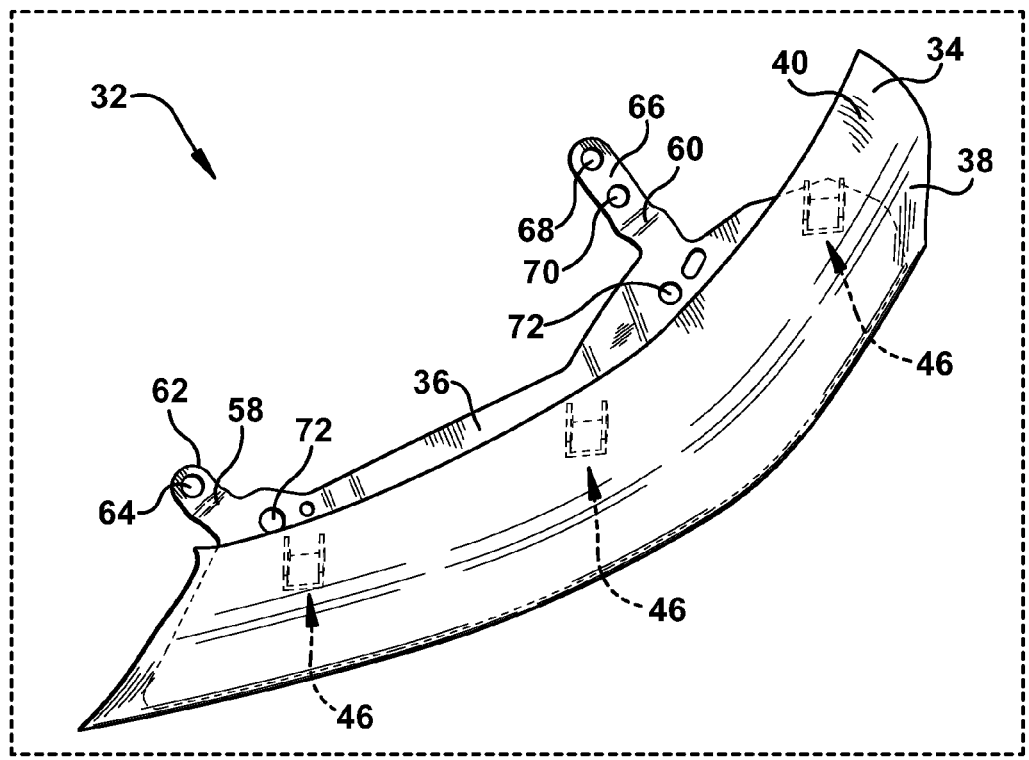
FIG. 2 is a front perspective view of the body part.

As illustrated in FIGS. 2-4, the pivot hole 64 and the initial and final position holes 68, 70 vertically extend through the pivot arm 62 and the attachment arm 66, respectively. The pivot hole 64 is disposed near an end of the pivot arm 62 that is distal to the back edge 56. The initial position hole 68 is disposed near an end of the attachment arm 66 that is distal to the back edge 56, whereas the final position hole 70 is disposed near an end of the attachment arm 66 that is proximal to the back edge 56. The pivot hole 64 and the initial and final position holes 68, 70 allow the garnish 32 to be attached to the vehicle 10 before coating/baking, then removed, and then later reinstalled on the vehicle 10 during final assembly. As will be discussed hereinafter, when the garnish 32 is mounted by the initial position hole 68, the garnish 32 is spaced from the vehicle 10. Alternatively, when the garnish 32 is mounted by the final position hole 70, the garnish 32 is nearly flush.

Figure 8:
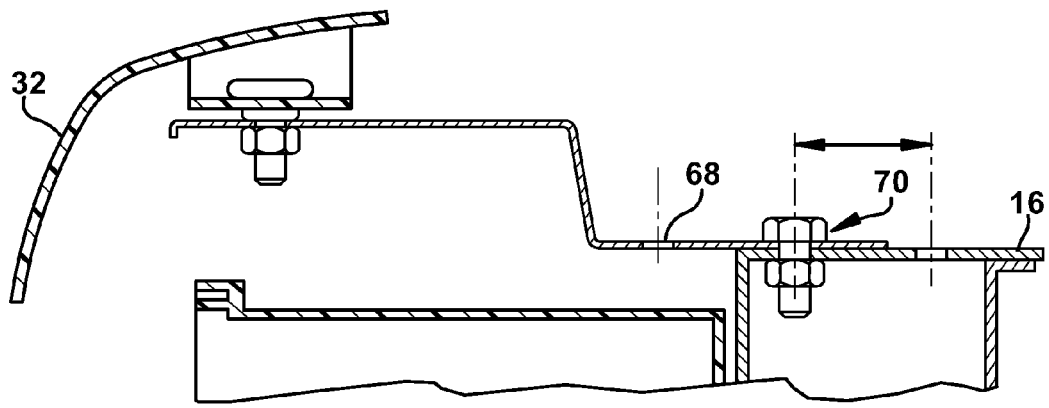
FIG. 8 is a sectional view along the dotted lines 8-8 of FIG. 7.

FIG. 1 illustrates the garnish 32 in the final position. The final position is characterized by the pivot pin 18 extending through the pivot hole 64 and a fastener extending through the final position hole 70 into the headlight assembly 20 and the bulkhead 16. Alternatively, FIGS. 7-8 shows the garnish 32 in the initial position. The initial position is characterized by the pivot pin 18 extending through the pivot hole 64 and a fastener extending through the initial position hole 68 and the bulkhead 16. When comparing the initial position versus the final position of the garnish 32, it is considered clear that the garnish 32 is spaced from the vehicle 10 when in the initial position. Because of this, coating/painting of all sides of the garnish 32 can be accomplished, thereby resulting in an improved aesthetic appearance of the garnish 32.

The mounting holes 72 vertically extend through the support plate 52 near the back edge 56. At final assembly, fasteners extend through the mounting holes 72 for engagement with the bulkhead 16 and headlight assembly 20, further contributing to the structural stability of the garnish 32 as shown in FIG. 7.

Figure 9:
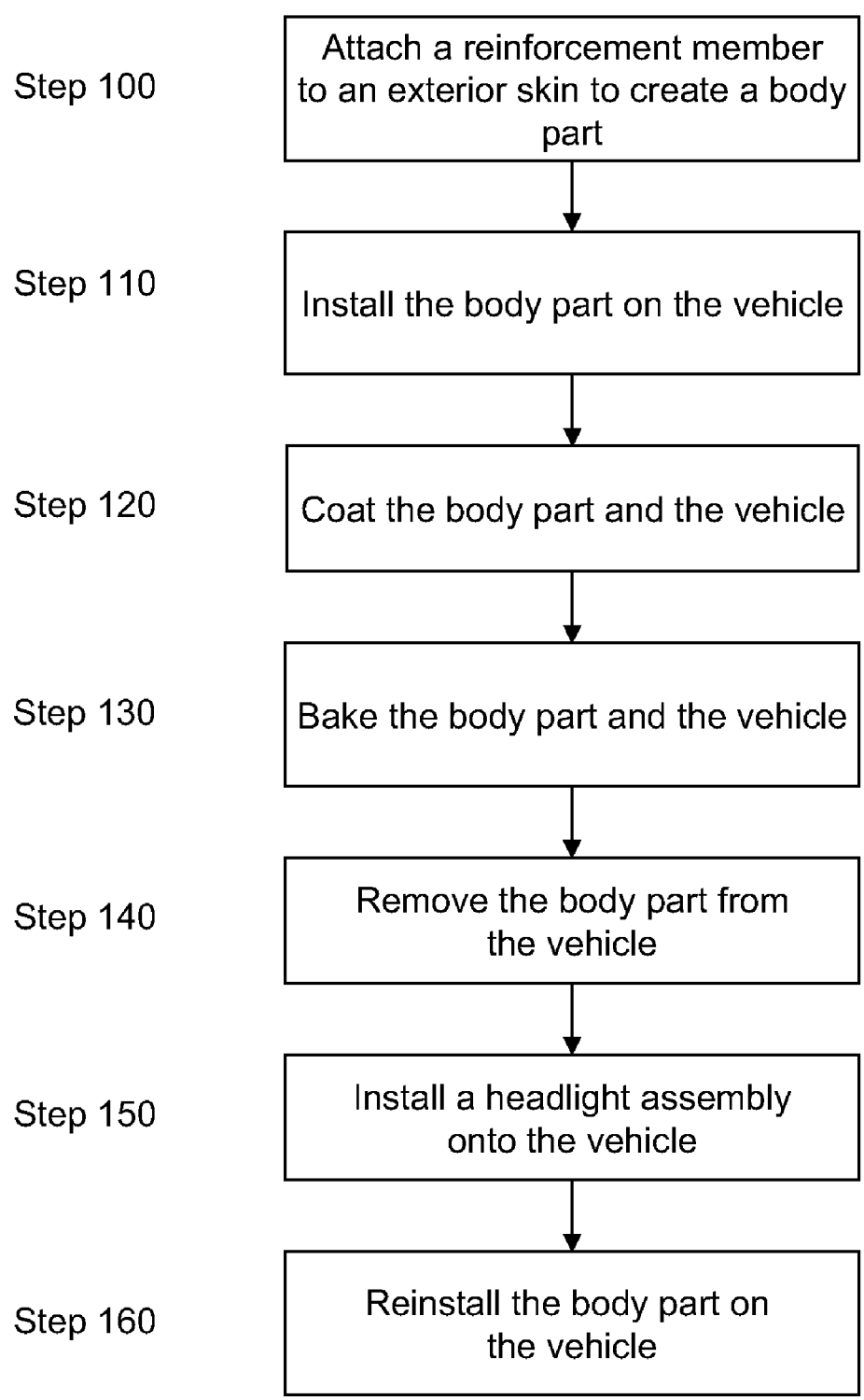
FIG. 9 is a flowchart illustrating a method of the present invention.

With reference to FIGS. 1-8, and with particular attention to FIG. 9, a method of the present invention is illustrated. While it is considered apparent that the garnish 32 and vehicle 10 may be assembled in many different ways, the following is provided to generally describe one preferred method or sequence of assembly. In Step 100, the reinforcement member 36 is attached to the exterior skin 34 to create the body part 14. In particular, a fastener extends through a hole in the J-clip 74 that is attached to the doghouse 46 of the exterior skin 34 and threadeningly engages the reinforcement member 36. Then, the body part 14 is installed on the vehicle 10 (Step 110) when the pivot pin 18, that extends from the bulkhead 16, is received in the pivot hole 64 of the pivot arm 62 of the reinforcement member 36 and a fastener extends between the initial position hole 68 of the attachment arm 66 and the bulkhead 16. In Step 120, the body part 14 and the vehicle 10 are coated. Then, the body part 14 and the vehicle 10 are baked in the baking oven (Step 130) at a temperature that is above a traditional temperature for plastic only body parts 14. Step 140 includes removing the body part 14 from the vehicle 10 by removing the fastener that extended between the initial position hole 68 and the bulkhead 16. Step 150 involves installing the headlight assembly 20 into the vehicle 10. Finally, the body part 14 is reinstalled on the vehicle 10 (Step 160) when the pivot pin 18 is received in the pivot hole 64 of the pivot arm 62 of the reinforcement member 36 and a fastener extends between the final position hole 70 of the attachment arm 66 and the bulkhead 16.

The present invention offers numerous advantages over the known art. For example, a body part with a plastic exterior skin can be fed through a bake oven at the same time as a metal vehicle body without a concern of sagging of any horizontal sections of the body part because of overheating. Further, the paint/coating can be cured at a higher temperature than would typically be used with plastic components. Because of this, the baking process takes less time. The metal reinforcement member 36 also prevents deflection of the body part 14 during use of the vehicle 10 by the vehicle owner. The metal reinforcement member 36 may also provide a suitable location for attachment of a grounding strap if the body part 14 is electrostatically coated. However, as mentioned hereinbefore, it is preferable that the exterior skin 34 of the garnish 32 be of a material that is electrically conductive. Thus, the need for the grounding strap is eliminated.

Because of the layout of the pivot arm 62, the attachment arm 66, the pivot hole 64, the initial position hole 68, and the final position hole 70, the present invention also provides that the garnish 32 can be temporarily installed onto the vehicle 10 before the coating/baking step. As described hereinbefore, this temporary installation is accomplished with the pivot pin 18 extending through the pivot hole 64 of the pivot arm 62 and a fastener extending through the initial position hole 68 of the attachment arm 66. After the coating/baking step, the garnish 32 is removed for installation of the headlight assembly 20. Then, the garnish 32 is reinstalled onto the vehicle 10. This is accomplished with the pivot pin 18 extending through the pivot hole 64 of the pivot arm 62 and a fastener extending through the final position hole 70 of the attachment arm 66. All of this occurs without additional components. Furthermore, the present invention teaches that the reinforcement member 36 is used during the coating process and then is also used in the final assembly of the vehicle 10, with no jig being required during the coating step.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A vehicle body part, comprising:
   a metal reinforcement member, including:
   a support plate that horizontally extends rearward from a curved front edge to a back edge,
   a pivot extension that downwardly extends from the back edge,
   a pivot arm that horizontally extends from the pivot extension and away from the back edge,
   an attachment extension that extends downwardly from the back edge, and
   an attachment arm that extends horizontally from the attachment extension and away from the back edge; and
   a plastic exterior skin, including:
   a fascia that extends vertically upward, and
   a top wall that extends horizontally from the fascia, wherein the plastic exterior skin is adapted to receive the metal reinforcement member and be connected to the metal reinforcement member with fasteners.

2. The vehicle body part of claim 1, wherein locating tabs extend from the exterior skin.

3. The vehicle body part of claim 1, further comprising:
   a doghouse structure disposed on an underneath side of the top wall, wherein the doghouse structure includes two generally parallel walls that extend downward from the underneath side of the top wall to a bottom wall that is generally horizontal.

4. The vehicle body part of claim 3, wherein J-clips attach to the bottom wall of the doghouse so as to threadingly engage the fasteners extending between the reinforcement member and the exterior skin.

5. The garnish according to claim 1, wherein the initial position hole is disposed near an end of the attachment arm that is distal to the back edge.

6. The garnish according to claim 1, wherein the final position hole is disposed near an end of the attachment arm that is proximal to the back edge.

7. The vehicle body part of the claim 1, wherein the metal reinforcement member extends laterally between a vehicle fender and a vehicle grill 8. The vehicle body part of claim 1, wherein a pivot hole in the pivot arm is disposed for pivotal engagement with a pivot pin of a bulkhead.

9. The vehicle body part of claim 1, wherein fasteners vertically extend through at least one of an initial position hole and a final position hole in the attachment arm for engagement with the vehicle bulkhead and a headlight assembly above which the metal reinforcement member is disposed.

10. The vehicle body part of claim 1, wherein the plastic exterior skin extends laterally between the vehicle fender and the vehicle grill.

* * * * *